US010125884B2

(12) United States Patent
Mukai et al.

(10) Patent No.: US 10,125,884 B2
(45) Date of Patent: Nov. 13, 2018

(54) ATTACHMENT STRUCTURE FOR SOLENOID VALVE

(71) Applicant: HONDA MOTOR CO., LTD., Tokyo (JP)

(72) Inventors: Tomoaki Mukai, Wako (JP); Tetsuya Mochizuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 52 days.

(21) Appl. No.: 15/506,027

(22) PCT Filed: Feb. 22, 2016

(86) PCT No.: PCT/JP2016/055091
§ 371 (c)(1),
(2) Date: Feb. 23, 2017

(87) PCT Pub. No.: WO2016/136677
PCT Pub. Date: Sep. 1, 2016

(65) Prior Publication Data
US 2018/0216744 A1    Aug. 2, 2018

(30) Foreign Application Priority Data
Feb. 26, 2015 (JP) .................... 2015-037085

(51) Int. Cl.
*F16K 27/00* (2006.01)
*F16K 31/06* (2006.01)
(Continued)

(52) U.S. Cl.
CPC ........ *F16K 27/003* (2013.01); *F16H 61/0009* (2013.01); *F16H 61/0213* (2013.01);
(Continued)

(58) Field of Classification Search
CPC .............. F16K 27/003; F16K 31/0679; F16H 61/0213; F16H 61/0009; F01L 2009/0403; F01L 2009/0425
(Continued)

(56) References Cited

U.S. PATENT DOCUMENTS 3,998,425 A * 12/1976 Braucksiek ............... H01F 7/06
251/129.16
5,535,725 A * 7/1996 Baker ................. F02M 25/0836
251/129.15
(Continued)

FOREIGN PATENT DOCUMENTS

JP  9-306558 A  11/1997
JP  H10-078154 A  3/1998
(Continued)

OTHER PUBLICATIONS

Decision to Grant dated Oct. 28, 2016 issued in counterpart Japanese Application No. 2016-552647 w/English translation (p. 6).
(Continued)

*Primary Examiner* — John Bastianelli
(74) *Attorney, Agent, or Firm* — Westerman, Hattori, Daniels & Adrian, LLP (57) ABSTRACT

A simple attachment structure with a minimized piece-part count, allowing easy grounding connection of the solenoid valve. The solenoid valve includes a body section with a built-in electromagnetic coil and a shaft-shaped valve section continued coaxially to the body section. An insertion hole for inserting the valve section in the control body is formed to the control body. The control body includes a locking mechanism composed of a locking piece with elasticity connected to a ground terminal of the electromagnetic coil and projecting out from an outer periphery of the body section and a concave portion provided on an upper surface of the control body. By inserting the valve section into the
(Continued)

insertion hole, the locking piece elastically engages with the engaged part to lock the solenoid valve, and the solenoid valve is grounded through a contact between the locking piece and the engaged portion.

6 Claims, 7 Drawing Sheets

(51) Int. Cl.
*F16H 61/00* (2006.01)
*F16H 61/02* (2006.01)
*F16K 27/04* (2006.01)
*F01L 9/04* (2006.01)

(52) U.S. Cl.
CPC ........ *F16K 27/048* (2013.01); *F16K 31/0679* (2013.01); *F01L 2009/0403* (2013.01); *F01L 2009/0425* (2013.01)

(58) Field of Classification Search
USPC ................ 251/129.15–129.22, 297, 291
See application file for complete search history.

(56) References Cited

U.S. PATENT DOCUMENTS

| | | | |
|---|---|---|---|
| 5,895,027 A | 4/1999 | Yagi | |
| 5,941,716 A * | 8/1999 | Yoshigi | H01R 9/2483 439/76.2 |
| 6,808,134 B2 * | 10/2004 | Noller | F02M 51/0671 251/129.19 |
| 6,854,707 B2 * | 2/2005 | Miyazoe | F16K 31/0675 251/129.15 |
| 2004/0140443 A1 * | 7/2004 | Miyata | F15B 13/0821 251/129.15 |

FOREIGN PATENT DOCUMENTS

| | | |
|---|---|---|
| JP | H10-318402 A | 12/1998 |
| JP | 2002-156063 A | 5/2002 |
| JP | 2007-187292 A | 7/2007 |
| JP | 2010-78154 A | 4/2010 |
| JP | 2011-185310 A | 9/2011 |

OTHER PUBLICATIONS

International Search Report dated Apr. 19, 2016, issued in counterpart International Application No. PCT/JP2016/055091 (1 page).

Office Action and Search Report dated Jul. 30, 2018, issued in counterpart Chinese Application No. 201680009651.4, with English translation. (13 pages).

* cited by examiner

ATTACHMENT STRUCTURE FOR SOLENOID VALVE

TECHNICAL FIELD

The present invention relates to an attachment structure for attaching a solenoid valve (electromagnetic valve) used for operation control of a shift control mechanism provided in an automatic transmission to a control body.

BACKGROUND ART

A solenoid valve (electromagnetic valve) for controlling line pressure for shift control and clutch pressure at the time of shifting is used in an automatic transmission. The solenoid valve is attached to a control body with a built-in hydraulic control circuit provided in the automatic transmission. Conventional methods for attaching the solenoid valve to the control body are available such as fixing of the solenoid valve with a fixing piece (bracket) in comb tooth shape (so-called guillotine form) as disclosed in Patent Document 1, and fixing of the solenoid valve with a pin inserted in the solenoid valve as disclosed in Patent Document 2. On one hand, the method of fixing using the fixing piece in comb tooth shape is to fit a lateral square U-shaped concave portion formed to the fixing piece into a slit-shaped cut-in groove arranged on three surfaces of an outer periphery of the solenoid valve. On the other hand, the method of fixing using the pin is to align a linear insertion groove provided on one surface of the outer periphery of the solenoid valve and an insertion hole of the control body of the solenoid valve, and then fix the pin inserted in the insertion groove to the insertion hole of the body.

The method of fixing using the fixing piece in comb tooth shape, as disclosed in Patent Document 1, needs alignment between the cut-in groove of the solenoid valve and the concave portion of the fixing piece (so as to face each other) at the time of installing the fixing piece. This alignment is performed by rotating the solenoid valve inserted in a mounting hole of the control body. Also in this case, when a plurality of the solenoid valves are attached using one fixing piece, the alignment of all the solenoid valves need to be performed at one time. Thus, the attachment of the solenoid valves requires much time and trouble. In particular, a larger number of the solenoid valves to be attached using one fixing piece complicates the above-described alignment operation, requiring more trouble and time for assembly thereof.

The method of fixing the solenoid valve using the pin, as disclosed in Patent Document 2, needs a pin corresponding to each of the solenoid valves, a stay for retaining each of the pins and a volt for fixing each of the stays for attaching the plurality of the solenoid valves. This requires a large parts count for the attachment structure and thus complicates the structure. This also requires many man-hours for attaching the solenoid valves such as an operation to insert the pin in each of the solenoid valves, an operation to set the retaining stay for the pin and a bolting operation. This further requires many steps of part machining such as surface machining of the volt and machining of a bolt-hole (tap) and a pin hole.

Moreover, as a problem common to the above-described methods of fixing using the pin and fixing using the fixing piece in comb tooth shape, a volt is needed for exclusive use for fixing and retaining of the parts, resulting in increase in parts count. In addition, there is another problem of increase in process of part machining including volt hole drilling and boss part machining.

CITATION LIST

Patent Literature

[Patent Document 1]: Japanese Patent Application Publication No. 2002-156063A
[Patent Document 2]: Japanese Patent Application Publication No. 2007-187292

SUMMARY OF INVENTION

Technical Problem

The present invention was made in view of above-mentioned point, and the purpose is to provide an attachment structure that can enhance the efficiency of attachment operation for a solenoid valve in a simple structure with a minimized piece-part count, achieve weight reduction and compactification of the device and easily establish an earth connection (ground connection) of the solenoid valve.

Solution to Problem

To solve the problem, the present invention provides an attachment structure for a solenoid valve for attaching the solenoid valve (20) to a control body (10). The solenoid valve (20) includes a body section (30) with a built-in electromagnetic coil (32) and a shaft-shaped valve section (25) having a valve function driven by the electromagnetic coil (32) and continued coaxially to the body section (30). An insertion hole (12) for inserting the valve section (25) is formed to the control body (10). The control body (20) includes a locking mechanism (50) composed of a locking piece (40) with elasticity connected to a ground terminal of the electromagnetic coil (32) and projecting out from an outer periphery (30a) of the body section (30) and an engaged portion (16) provided on an upper surface (10a) of the control body (10). By inserting the valve section (25) in the insertion hole (12), the locking piece (40) elastically engages with the engaged portion (16) to lock the solenoid valve (20), and the solenoid valve (20) is grounded through a contact between the locking piece (40) and the engaged portion (16).

In other words, the attachment structure of the solenoid valve in accordance with the present invention is configured so that the locking piece engages with the engaged portion of the control body to lock the solenoid valve by inserting the valve section of the solenoid valve in the insertion portion of the control body at the time of attaching the solenoid valve to the control body including the locking piece projecting from an side surface of the body section with the built-in electromagnetic coil. And, at that time, the locking piece connected to the ground terminal abuts on the control body, whereby the solenoid valve is grounded via the control body.

According to the attachment structure of the solenoid valve in accordance with the present invention, the locking piece of the locking mechanism elastically engages with the engaged portion of the control body by inserting the valve section of the solenoid valve in the insertion hole of the control body, thereby locking (fixing) the solenoid valve to the control body. This enables fixing of the solenoid valve to the control body in a simple operation. This can also enhance the efficiency of the attachment operation of the solenoid valve. Furthermore, the configuration of the elastic engagement between the locking piece provided to the solenoid valve and the engaged portion provided to the control body needs no tool for fixing the solenoid valve, but enables manual attachment of the solenoid valve to the control body.

Further, the locking mechanism for the attachment structure in accordance with the present invention is configured so that the locking piece provided to the solenoid valve elastically engages with the engaged portion provided to the control body. This makes any separate parts, required for the conventional structure, such as a stay or a volt used for the attachment structure, as disclosed in Patent Documents 1 and 2, needless. In this manner, a simple structure with a small parts count can be established.

Moreover, in the attachment structure in accordance with the present invention, the contact between the locking piece connected to the ground terminal of the solenoid valve (electromagnetic coil section) and the engaged portion of the control body can secure the earth connection of the solenoid valve. Accordingly, as the earth connection is enabled only by attaching the solenoid valve to the control body, in this regard also, the attachment operation of the solenoid valve can be simplified with a reduced parts count.

Furthermore, in this attachment structure of the solenoid valve, the locking piece (40) may be either a portion of a yoke (39) surrounding the electromagnetic coil (32) or an elastic metal piece joined integrally with the yoke (39). According to this configuration, as the locking piece of the locking mechanism is configured using the yoke provided conventionally to the solenoid valve, the parts count of the solenoid valve and the attachment structure thereof can be reduced to achieve the simplification of the configuration. Also, as the locking piece is configured using the yoke, the earth connection of the solenoid valve using the locking mechanism can be performed more properly.

Besides, in this attachment structure of the solenoid valve, the engaged portion (16) may be a concave portion formed by hollowing the upper surface (10a) of the control body (10). The concave portion includes a groove portion (17) extending, on the upper surface (10a) of the control body (10), from the engaged portion (16) toward the opposite side to the insertion portion (12). The groove portion (17) is formed to be narrower than the locking piece (40) and the engaged portion (16) in width. The groove part (17) is configured so that the locking piece (40) retreats from a position at which the locking piece (40) engages with the engaged portion (16) by bending the locking piece (40) using a tool (60) inserted in the engaged portion (16) via the groove portion (17).

According to this configuration, by inserting the tool in the engaged portion via the groove portion, the engagement of the locking piece can be cancelled easily and properly using the tool. In addition, according to this configuration, as the groove portion for inserting the tool in the engaged portion is formed on the upper surface of the control body, the solenoid valve can be detached from the control body without disassembling the control body (assembly). This establishes the attachment structure superior in assembling performance and maintenance.

Furthermore, as an oil passage through which hydraulic fluid circulates can be formed under the solenoid valve in the control body, the layout flexibility of the oil passage in the control body can be improved.

Alternatively, the engaged portion (16) may be a through hole (18) penetrating the control body (10) from the upper surface (10a) to a lower surface (10c) thereof, and configured so that the locking piece (40) retreats from the position at which the locking piece (40) engages with the engaged portion (16) by bending the locking piece (40) using the tool (60) inserted in the engaged portion (16) via a through hole from the lower surface (10c) side of the control body (10).

According to this configuration, by inserting the tool in the engaged portion via the through hole, the engagement of the locking piece can be cancelled simply and properly using the tool. Also, this configuration can achieve the simplification of the shape of the control body and streamline the machining process of the control body. The reference numerals and symbols in the above parentheses represent the reference numerals and symbols used for structural elements in an embodiment which will be described later, as an example of the present invention.

Advantageous Effects of Invention

As simple structure with a small parts count, the attachment structure of the solenoid valve in accordance with the present invention can achieve the efficiency of attachment and detachment operations of the solenoid valve, as well as weight reduction and compactification of the device, allowing the easy earth connection of the solenoid valve.

BRIEF DESCRIPTION OF DRAWINGS

FIGS. 1A and 1B are views illustrating an attachment structure of a solenoid valve in accordance with the first embodiment of the present invention, of which

FIGS. 2A to 2D are views illustrating a solenoid valve, of which

FIGS. 3A to 3C are views illustrating an attachment procedure for attaching a solenoid valve, of which

FIGS. 4A and 4B are views showing an attachment structure for a solenoid valve in accordance with the second embodiment of the present invention, of which

FIGS. 5A and 5B are views illustrating an attachment structure of a solenoid valve in accordance with the third embodiment of the present invention, of which

FIGS. 6A and 6B are views illustrating an attachment structure of a solenoid valve in accordance with the fourth embodiment of the present invention, of which

DESCRIPTION OF EMBODIMENTS

Embodiments of the present invention will be described hereinafter with reference to appending drawings.

The First Embodiment

Figure 1A:
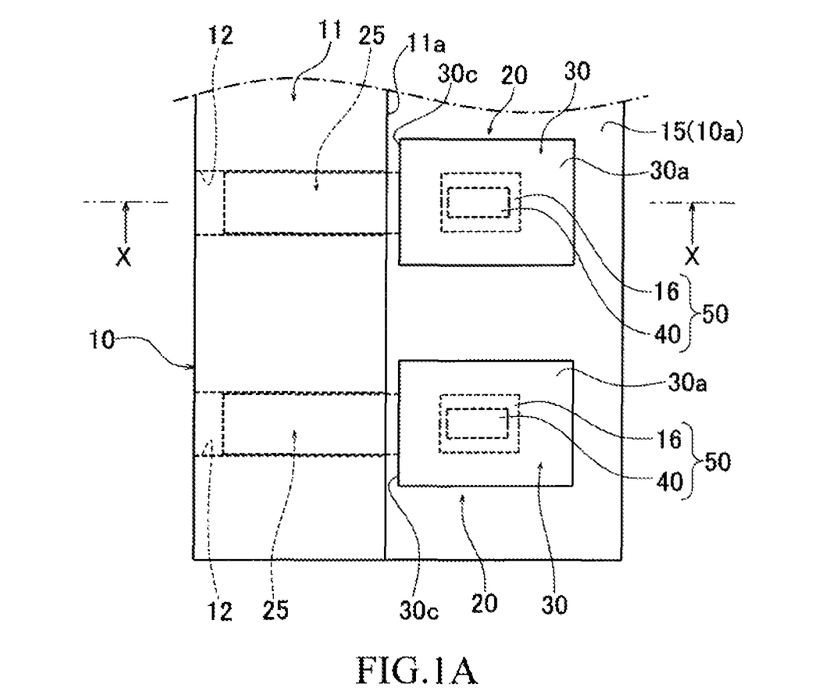
FIG. 1A is a plan view of a control body to which the solenoid valve is attached.
Figure 1B:
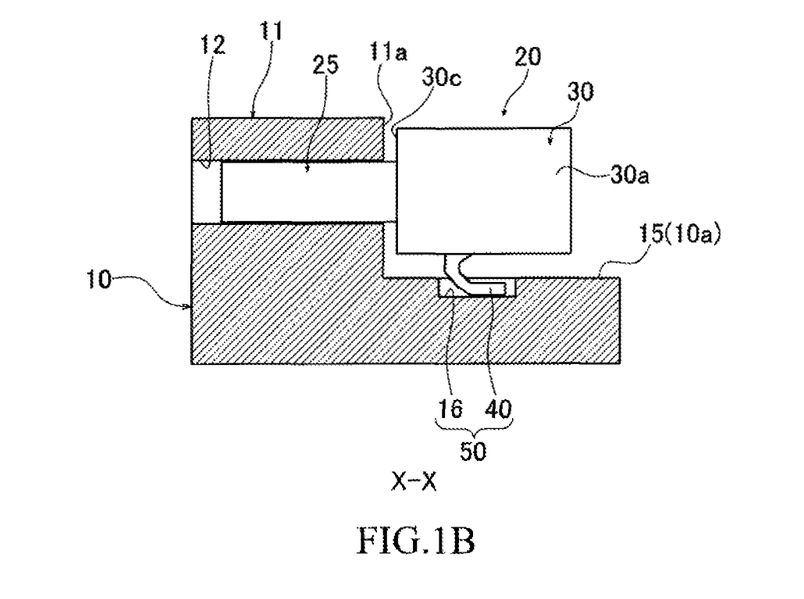
FIG. 1B is a view corresponding to the X-X arrow sectional view of FIG. 1A.
Figure 2A:
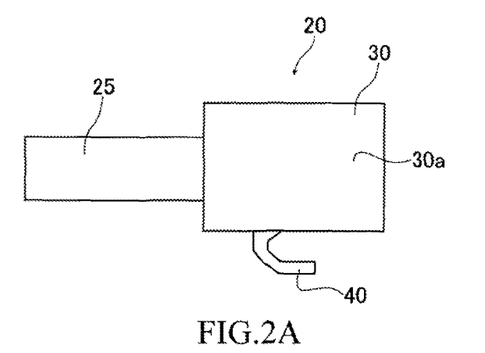
FIG. 2A is a side elevation view thereof.
Figure 2B:
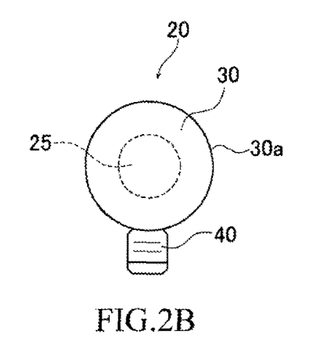
FIG. 2B is a rear elevation view thereof.
Figure 2C:
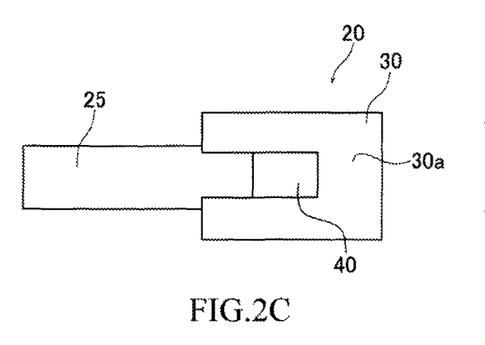
FIG. 2C is a bottom view thereof.
Figure 2D:
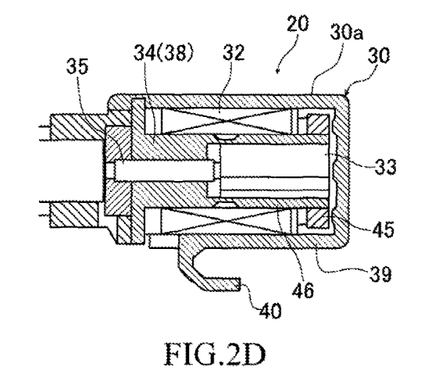
FIG. 2D is a sectional side elevation view illustrating an internal structure of the body section.

FIGS. 1A and 1B are views illustrating an attachment structure of a solenoid valve in accordance with the first embodiment of the present invention, of which FIG. 1A is a plan view of a control body and the solenoid valve, and FIG. 1B is a view corresponding to the X-X arrow sectional view of FIG. 1A. FIGS. 2A to 2D are views illustrating the solenoid valve, of which FIG. 2A is a side elevation view thereof, FIG. 2B is a rear elevation thereof, FIG. 2C is a bottom view thereof, and FIG. 2D is a sectional side elevation view illustrating an internal structure of the body section. The attachment structure of the solenoid valve of this embodiment has the purpose of attaching a solenoid valve 20 to a control body 10 having a hydraulic control circuit and provided in an automatic transmission for a vehicle.

The solenoid valve 20 is configured to include a valve section 25 and a body section (electromagnetic coil section) 30 provided coaxially with each other. The valve section 25 is formed into a shaft having an approximately circular cross section. The body section 30 is formed into a column coupled to an end portion of the valve section 25 in the axial direction and having a diameter larger than the valve section 25. It should be noted that in the following description, "axial direction" shall refer to an axial direction of the solenoid valve 20 attached to the control body 10, and other expressions representing vertical and horizontal directions shall refer to those in each of the figures.

The body section 30 of the solenoid valve 20 is configured to include an electromagnetic coil 32 generating magnetic force by electricity, a plunger 33 supported so as to be movable in the axial direction, a stator 38 having a magnetic attraction core 34 magnetically attracting the plunger 33 in the axial direction by magnetic force generated by the electromagnetic coil 32, a shaft 35 inserted in and arranged to the magnetic attraction core 34 and transmitting axial force of the plunger 33 to the outside, a yoke 39 covering an outer periphery of the electromagnetic coil 32 and a ring core 45 composed of magnetism metal in ring shape fit to an outer periphery of a magnetism delivery core 46 (e.g., ferromagnetic material such as iron).

The electromagnetic coil 32 drives a valve body (not shown in the figure) built in the valve section 25 in the axial direction by magnetic force due to electricity. The yoke 39 is made of magnetism metal (e.g., ferromagnetic material such as iron) covering the circumference of the electromagnetic coil 32 to flow a magnetic flux and formed into an approximately cup shape covering the outer periphery of the electromagnetic coil 32.

Moreover, a portion of a tip of the yoke 39 is bent outward in the diameter direction of the body section 30. The tip of that portion is structured as a locking piece 40 projecting from the outer periphery 30a of the body section 30. A detailed configuration of the locking piece 40 will be described later.

In addition, the yoke 39 is connected to a ground terminal (earth terminal) of the solenoid valve 20 (electromagnetic coil section 32), of which detailed illustration is omitted.

The control body 10 is a housing with a built-in hydraulic control circuit for shift control and made of metal such as aluminum. An outer shape thereof is formed into a box in a shape such as a thin rectangular solid. An illustration of a whole shape thereof is omitted. A projection 11 in an approximately rectangular solid shape projecting upward is provided to one end of an upper surface 10a of the control body 10. On one side surface 11a of the projection 11, an insertion hole (insertion portion) 12 is opened for inserting therein the valve section 25 of the solenoid valve 20. A plurality of the insertion holes 12 are formed side by side on the side surface 11a. Each of the insertion holes 12 is formed as a through hole in a cylindrical shape. The axial directions of the plurality of the insertion holes 12 extend in parallel to each other. The valve section 25 of the solenoid valve 20 is inserted in the insertion hole 25 in the axial direction. Further, the upper surface 10a adjacent to the projection 11 of the control body 10 is formed to be an attaching surface 15 planar in shape lower than the projection 11 by one step. As shown in FIGS. 1A and 1B, the solenoid valve 20 is attached to the control body 10 in a state that the valve section 25 is inserted in the insertion hole 12 and the body section 30 is mounted on the attaching surface 15.

A locking mechanism 50 is installed to the solenoid valve 20 and the control body 10 for locking the solenoid valve 20 attached to the control body 10. The locking mechanism 50 is composed of a locking piece 40 provided to the solenoid valve 20 and a concave portion (engaged portion) 16 provided to the control body 10. On one hand, the locking piece 40 is a projection-shaped pawl piece formed to (a lower side surface of) the outer periphery 30a of the body section 30 of the solenoid valve 20 and also a metal sheet-like strip with elasticity (flexibility). This locking piece 40 projects from (the lower surface of) the outer periphery 30a of the body section 30 outward in the diameter direction. A tip thereof extends toward to the rear side in the axial direction along (the lower surface of) the outer periphery 30a of the body section 30. A tip portion 40a of the tip is arranged facing the rear side in the axial direction. On the other hand, the concave portion 16 is an approximately rectangular hollow formed on the attaching surface 15 (upper surface 10a) of the control body 10. The concave portion 16 is formed to have such a dimension and shape as allowing the locking piece 40 to sink therein, or in detail, to be larger in length and width (in the axial dimension) than the locking piece 40. Also, this concave portion 16 is positioned in the direction in which the valve section 25 is inserted in the insertion hole 12 on the attaching surface 15 (upper surface 10a) of the control body 10, and also positioned at a position dislocated downward by a prescribed height from the center of the insertion hole 12. And, the concave portion 16 and the locking piece 40 are formed to be positioned at a position at which the locking piece 40 faces the concave portion 16 in a state that the valve section 25 of the solenoid valve 20 remains inserted deeply into the insertion hole 12 of the control body 10 (namely, on the front side from the position (of the locking piece 40) when an end surface 30c of the body section 30 would abut on the side surface 11a of the projection 11).

Figure 3A:
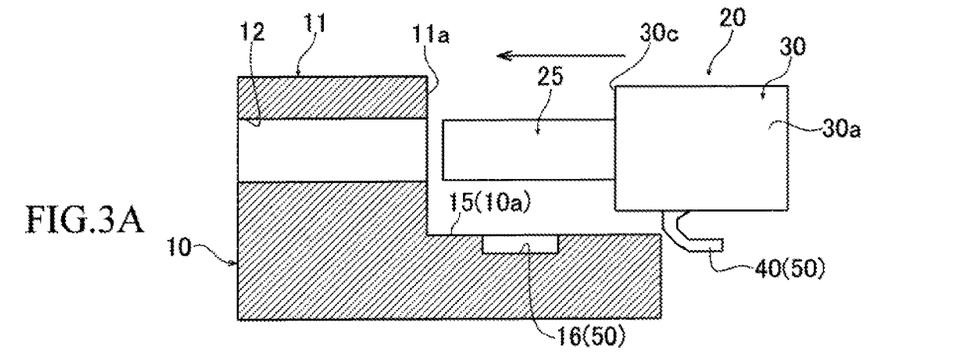
FIG. 3A is a view showing a state before a valve section of the solenoid valve is inserted in an insertion portion of a control body.
Figure 3B:
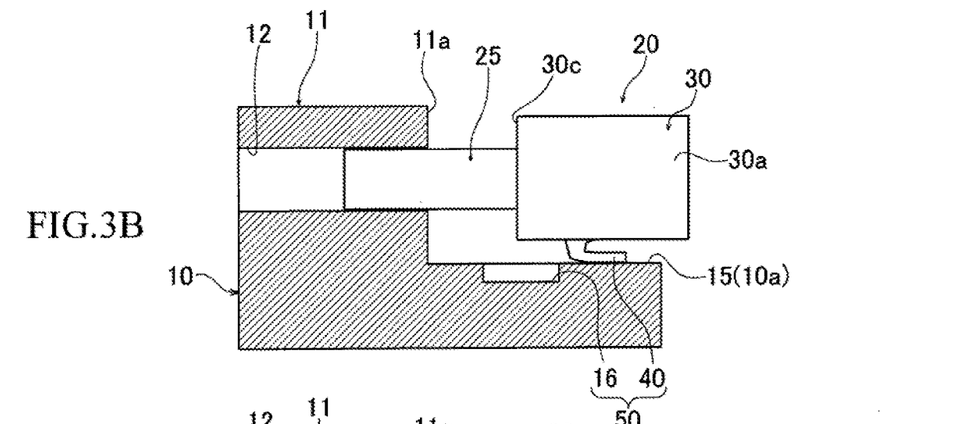
FIG. 3B is a view showing a state before a locking piece of a locking mechanism engages with a concave portion and FIG. 3C is a view showing a state that the locking piece is in engagement with the concave portion and thus the solenoid valve is locked.
Figure 3C:
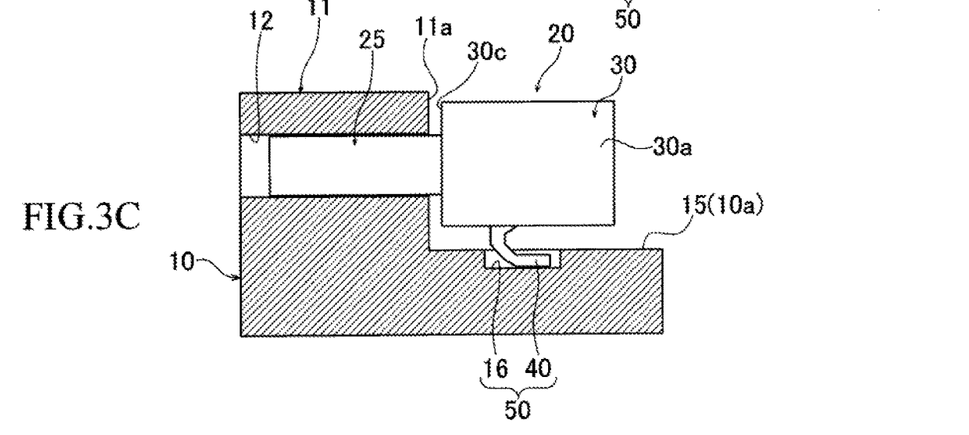

Next, an attachment procedure for attaching the solenoid valve 20 to the control body using the attachment structure of the above-described configuration 10 will be describe. FIGS. 3A to 3C are views for illustrating the attachment procedure for attaching the solenoid valve. FIG. 3A is a view showing a state before the valve section 25 of the solenoid valve 20 is inserted in the insertion portion 12 of the control body 10. FIG. 3B is a view showing a state before the locking piece 40 of the locking mechanism 50 engages with the concave portion 16. FIG. 3C is a view showing a state that the locking piece 40 is in engagement with the concave portion 16 and thus the solenoid valve 20 is locked.

For attaching the solenoid valve 20 to the control body 10, first, as shown in FIG. 3A, the solenoid valve 20 is moved above and along the attaching surface 15 in the axial direction. In this manner, as shown in FIG. 3B, the valve section 25 of the solenoid valve 20 is inserted in the insertion hole 12 on the side surface 11a of the projection 11. By moving the solenoid valve 20 further leftward along the axial direction in a state that the valve section 25 is inserted in the insertion hole 12, the valve section 25 is inserted more deeply into the insertion hole 12. At this time, the movement of the solenoid valve 20 along the axial direction of the valve section 25 allows the locking piece 40 of the solenoid valve 20 to abut on the attaching surface 15 of the control body 10. When the solenoid valve 20 is moved further in the axial direction in that state, the locking piece 40 is elastically deformed (or bent). Thus, as shown in FIGS. 3B and 3C, the locking piece 40 climbs over the attaching surface 15 on the front side from the concave portion 16 to elastically engage (namely, snap-in engage) with the concave portion 16. Namely, the locking piece 40 sinks in the concave portion 16 on front side from the position (of the locking piece 40) when the end surface (on the valve section 25 side) 30c of the body section 30 of the solenoid valve 20 would abut on the side surface 11a of the projection 11 of the control body 10. This establishes a state that any movement of the solenoid valve 20 in the axial direction is regulated (or the solenoid valve 20 remains attached to the control body 10). Following the above-described procedure, the attachment of the solenoid valve 20 to the control body 10 is completed.

In the above-described attachment procedure, the engagement of the locking piece 40 with the concave portion 16 establishes a contact between the locking piece 40 composed of a portion of the yoke 39 connected to the ground terminal and the concave portion 16 of the control body 10 made of aluminum. This can secure a ground connection (earth connection) of the solenoid valve 20 (electromagnetic coil section 32).

In this manner, the attachment structure of this embodiment is configured so that, at the time of attaching to the control body 10 the solenoid valve 20 provided with the locking piece 40 projecting from the outer periphery 30a of the body section 30 having the built-in electromagnetic coil 32, the valve section 25 of the solenoid valve 20 is inserted in the insertion hole 12 of the control body 10, whereby the locking piece 40 engages with the concave portion 16 of the control body 10 to lock the solenoid valve 20. Also, at this time, the locking piece 40 connected to the ground terminal abuts on the control body 10, thereby allowing the solenoid valve 20 to be grounded via the control body 10.

As described above, in the attachment structure of this embodiment, by inserting the valve section 25 of the solenoid valve 20 in the insertion hole 12 of the control body 10, the locking piece 40 of the locking mechanism 50 elastically engages with the concave portion 16 to lock (fix) the solenoid valve 20. This enables simple operation of fixing the solenoid valve 20 to the control body 10 and promotion of the efficiency of the attachment operation of the solenoid valve 20. Moreover, the configuration that the locking piece 40 of the solenoid valve 20 elastically engages with the concave portion 16 of the control body 10 makes any tool for fixing the solenoid valve 20 needless and thus enables manual attachment of the solenoid valve 20.

Furthermore, the locking mechanism 50 provided in the attachment structure of this embodiment is configured so that the locking piece 40 of the solenoid valve 20 elastically engages with the concave portion 16 of the control body 10. This makes other parts such as a stay and a volt indispensable for conventional attachment structures, as disclosed in Patent Documents 1 and 2, needless. Accordingly, a simple structure with a small parts count is established.

Furthermore, in the attachment structure of this embodiment, the contact between the locking piece 40 connected to the ground terminal of the solenoid valve 20 (electromagnetic coil section 32) and the concave portion 16 of the control body 10 can secure the earth connection of the solenoid valve 20. Therefore, the earth connection can be established only by attaching the solenoid valve 20 to the control body 10. In that respect also, the attachment operation for the solenoid valve 20 can be simplified with a reduced parts count.

Second Embodiment

Next, the second embodiment of the present invention will be described. Further, in descriptions of the second embodiment and the corresponding drawings, same references are given to the components which are the same as or corresponding to the first embodiment, and the detailed descriptions of the parts are omitted below. In addition, the matters undescribed below are the same as the first embodiment. This applies to the other embodiments.

Figure 4A:
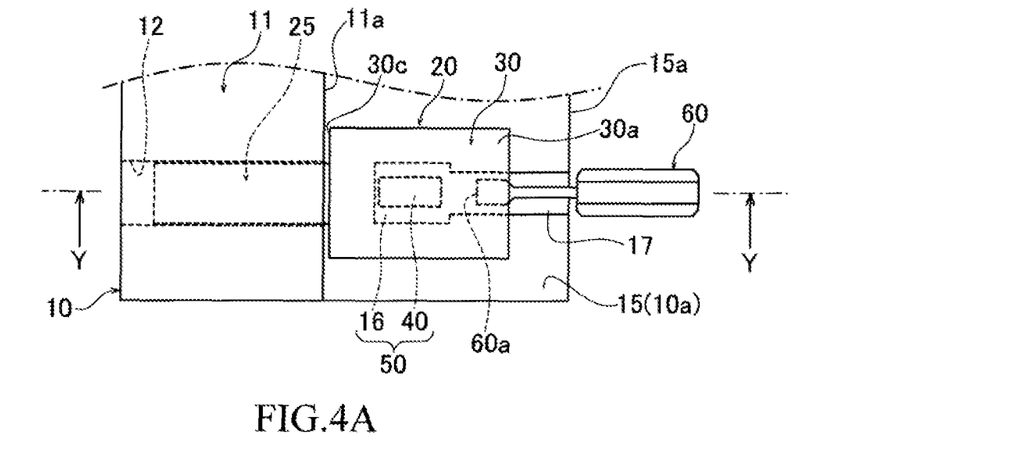
FIG. 4A is a plan view of a control body to which the solenoid valve is attached.
Figure 4B:
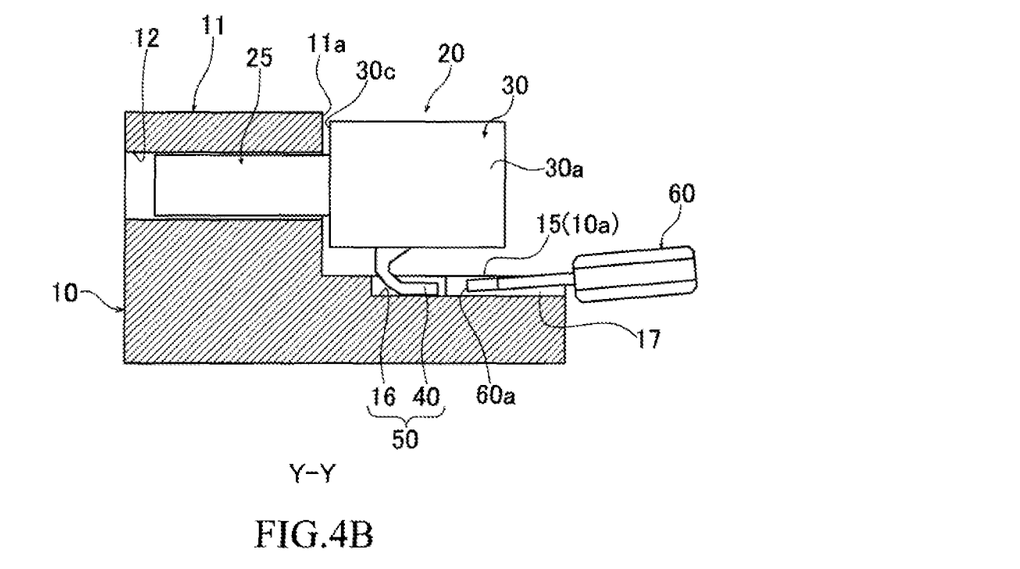
FIG. 4B is the Y-Y arrow view (partial sectional view) of FIG. 4A.

FIGS. 4A and 4B are views illustrating the attachment structure for the solenoid valve in accordance with the second embodiment of the present invention, of which FIG. 4A is a plan view of the control body 10 to which the solenoid valve 20 is attached, and FIG. 4B is the Y-Y arrow view (partial sectional view) of FIG. 4A. The attachment structure of this embodiment includes a groove portion 17 communicating to the concave portion 16 formed on the attaching surface 15 of the control body 10, in addition to the configuration of the 8 attachment structure of the first embodiment. This groove portion 17 is a linear groove penetrating along the axial direction from an end side 15a of the attaching surface 15 on the opposite side to the insertion hole 12 to the concave portion 16. The groove portion 17 has the same depth as the concave portion 16 and a narrower width (with respect to the axial direction) than the concave portion 16 and the locking piece 40. And, the groove portion 17 is configured so that the locking piece 40 retreats from a position at which the locking piece 40 engages with the concave portion 16 by pressing and bending the locking piece 40 using a tool 60 inserted in the concave portion 16 via the groove portion 17.

Namely, for detaching the solenoid valve 20 from the control body 10 in the attachment structure of this embodiment, as shown in FIGS. 4A and 4B, the engagement of the locking piece 40 with the concave portion 16 is cancelled by inserting a tip 60a of the tool 60 such as a screw driver in the concave portion 16 via the groove portion 17 and then pressing the tip of the locking piece 40 deeply and upward in the axial direction with the tip 60a of the tool 60.

In the attachment structure of this embodiment, the above-described groove portion 17 enables easy release of the solenoid valve 20 fixed to the control body 10. This can achieve the efficiency of detachment operation of the solenoid valve 20.

Moreover, according to the attachment structure of this embodiment, the groove portion 17 formed to the attaching surface 15 (upper surface 10a) of the control body 10 can attach/detach the solenoid valve 20 to/from the control body 10 without disassembling the control body 10 (assembly). Furthermore, the groove portion 17 formed to the attaching surface 15 (upper surface 10a) of the control body 10 enables formation of an oil passage, in which hydraulic oil circulates (not shown in the figure), at a position right under the solenoid valve 20 in the control body 10. This can improve the layout flexibility of the oil passage in the control body.

Third Embodiment

Figure 5A:
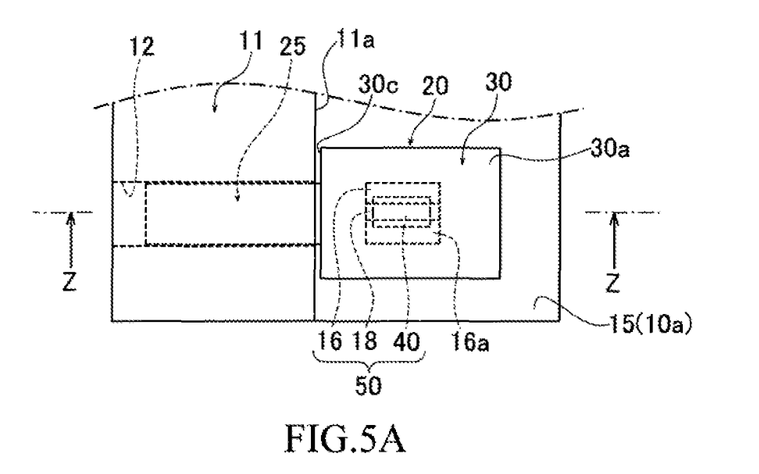
FIG. 5A is a plan view of a control body to which the solenoid valve is attached.
Figure 5B:
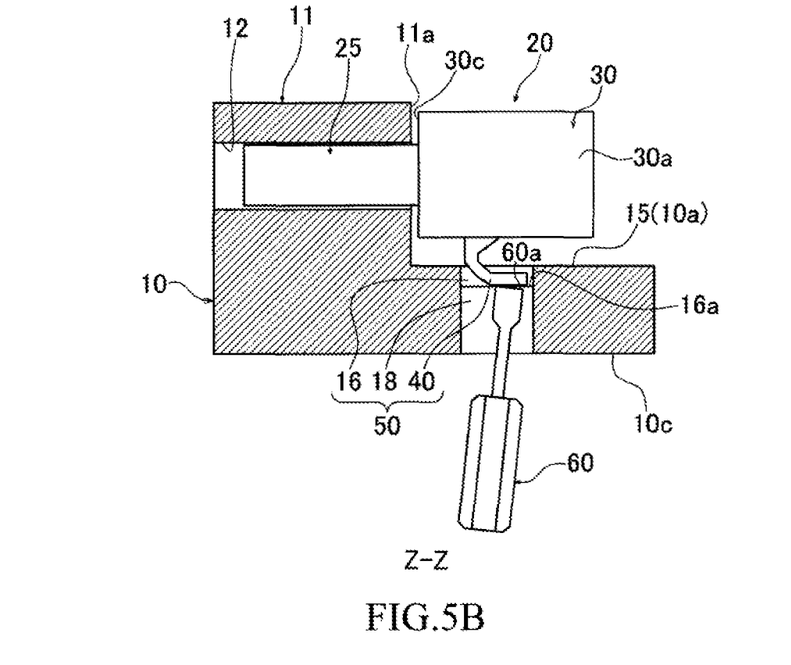
FIG. 5B is the Z-Z arrow view (partial sectional view) of FIG. 5A.

Next, the third embodiment of the present invention will be described. FIGS. 5A and 5B are views illustrating an attachment structure for the solenoid valve in accordance with the third embodiment of the present invention, of which FIG. 5A is a plan view of the control body to which the solenoid valve 20 is attached, and FIG. 5B is the Z-Z arrow view (partial sectional view) of FIG. 5A. Compared to the attachment structure of the first embodiment, the attachment structure of the third embodiment is configured to add thereto a through hole 18 penetrating from a bottom surface (bottom part) of the concave portion 16 provided to the control body 10 to a lower surface 10c of the control body 10. In other words, the locking mechanism 50 of this embodiment is composed of the locking piece 40, the concave portion 16 and the through hole 18.

As shown in FIG. 5A, the through hole 18 is formed to have a smaller width than the concave portion 16 and a larger width than the locking piece 40 in the plan view. The plan view here corresponds to the vertical view in the figure. The same shall apply hereafter. And, in this embodiment also, as shown in FIG. 5B, the locking piece 40 is configured to retreat from the position, at which the locking piece 40 engages with the concave portion 16, by pressing and bending the locking piece 40 with the tip 60a of the tool 60 inserted in the concave portion 16 via the through hole 18.

Namely, for detaching the solenoid valve 20 from the control body 10 in the attachment structure of this the embodiment, as shown in FIGS. 5A and 5B, the engagement of the locking piece 40 with the concave portion 16 is cancelled by inserting the tip 60a of the tool 60 such as a screw driver from the lower surface 10c of the control body 10 into the through hole 18 and then pressing the locking piece 40 upward with the tip 60a of the tool 60.

In the attachment structure of this embodiment, the above-described through hole 18 enables easy release of the solenoid valve 20 fixed to the control body 10. This can achieve the efficiency of detachment operation of the solenoid valve 20.

Compared to the configuration of the first embodiment, this embodiment has only the additional through hole 18 penetrating from the bottom surface 16a of the concave portion 16 to the lower surface 10c of the control body 10. This enables the simplification of the shape of the control body 10 as well as easy release of the solenoid valve 20. This can achieve the efficiency of detachment operation of the solenoid valve 20 and streamline the machining process of the control body.

In the attachment structure of this embodiment, as the through hole 18 is formed to have a smaller dimension than the concave portion 16 (or smaller width in the plane view), the locking piece 40 in engagement with the concave portion 16 abuts in surface contact to the bottom surface 16a of the concave portion 16. This can secure the earth connection due to the contact between the locking piece 40 and the control body 10.

Fourth Embodiment

Figure 6A:
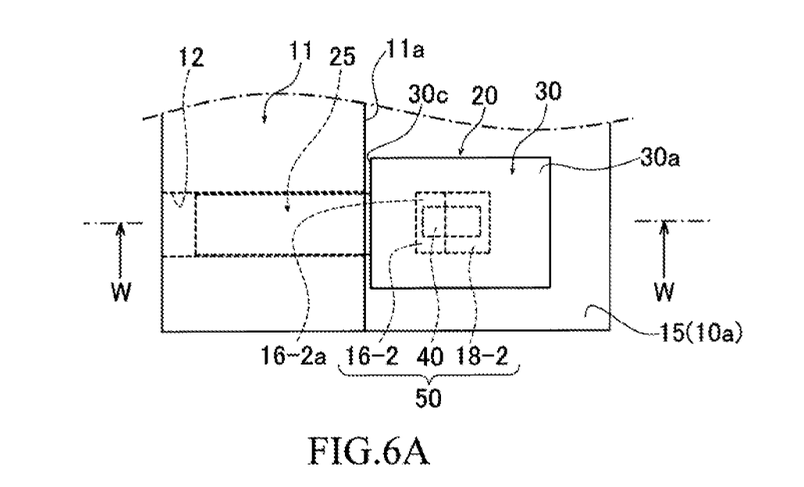
FIG. 6A is a plan view of a control body to which the solenoid valve is attached.
Figure 6B:
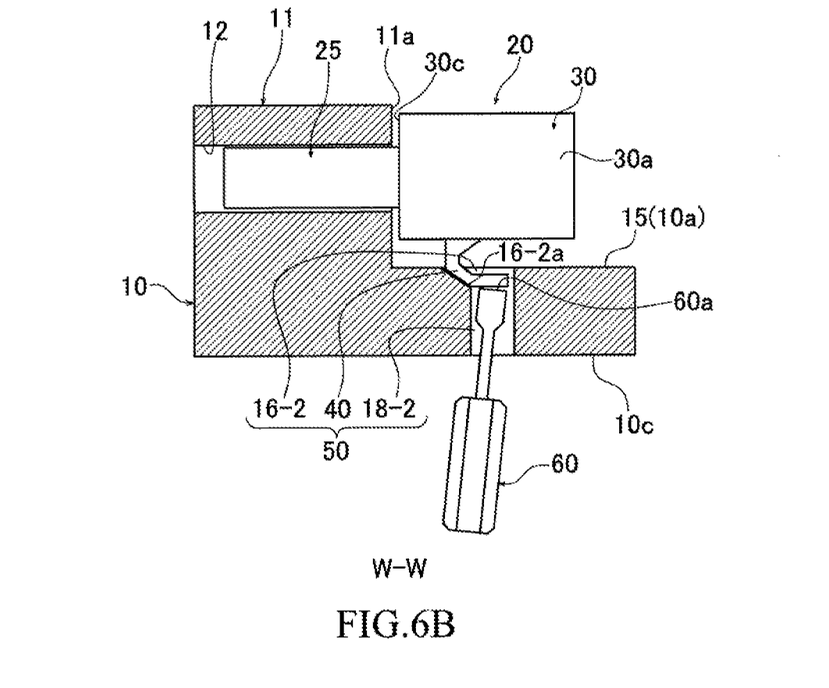
FIG. 6B is the W-W arrow view (partial sectional view) of FIG. 6A.

Next, the fourth embodiment of the present invention will be described. FIGS. 6A and 6B are views illustrating an attachment structure for the solenoid valve in accordance with the fourth embodiment of the present invention, of which FIG. 6A is a plan view of the control body 10 to which the solenoid valve 20 is attached, and FIG. 6B is the W-W arrow view (partial sectional view) of FIG. 6A. The attachment structure of the fourth embodiment is configured to include a concave portion 16-2 having a bottom surface (contact surface) 16-2a in an inclined surface shape and a through hole 18-2 penetrating from a position except the bottom surface 16-2a to the lower surface 10c of the control body 10 in the concave portion 16-2, instead of the concave portion 16 and the through hole 18 provided in the attachment structure of the third embodiment.

The bottom surface 16-2a of the concave portion 16 is gradually inclined downward from the root side toward the tip side of the locking piece 40. This inclined surface is formed into a shape along a lower surface of the locking piece 40 on the root side. Also, this bottom surface 16-2a extends from one end of the concave portion 16 in the lengthwise direction (horizontal direction in the figure) to a halfway position. And, in the state that the locking piece 40 is in engagement with the concave portion 16-2, the lower surface of the locking piece 40 on the root side abuts on the bottom surface 16-2a in surface contact. This can secure the earth connection due to the contact between the locking piece 40 and the control body 10.

In addition, for detaching the solenoid valve 20 from the control body 10 in the attachment structure of this embodiment also, as shown in FIGS. 6A and 6B, the engagement of the locking piece 40 with the concave portion 16-2 is cancelled by inserting the tip 60a of the tool 60 such as a screw driver from the lower surface 10c of the control body 10 into the through hole 18-2 and then pressing the locking piece 40 upward with the tip 60a of the tool 60.

Fifth Embodiment

Figure 7:
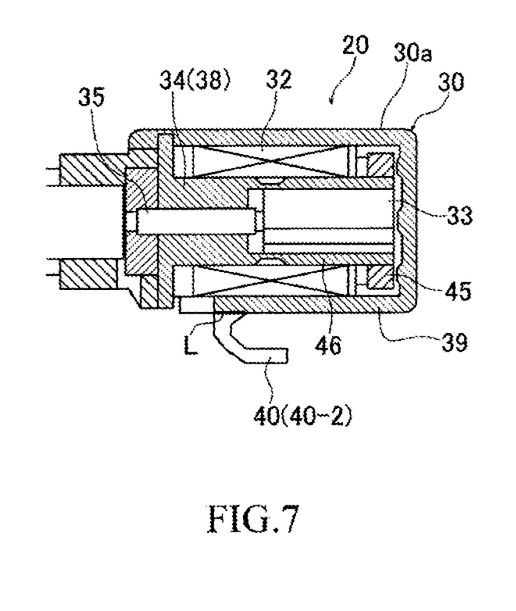
FIG. 7 is a sectional side elevation view illustrating a body section of a solenoid valve according to an attachment structure of the solenoid valve in accordance with the fifth embodiment of the present invention.

Next, the fifth embodiment of the present invention will be described. FIG. 7 is a sectional side elevation view illustrating the body section of the solenoid valve in accordance with the fifth embodiment of the present invention. In the first embodiment, on the one hand, the configuration that the locking piece 40 is structured by the portion of the yoke 39 is described. In the fifth embodiment, on the other hand, for connecting the locking piece 40 to the ground terminal of the solenoid valve 20 (electromagnetic coil section 32), the locking piece 40 is structured by attaching a support piece (stay) 40-2 as a separate member made of elastic metal to the yoke 39 by welding a welded portion L. In that case, for securing the conductivity of the separate support piece 40-2, a surface of the support piece 40-2 should be prevented from plating processing (insulation).

In the foregoing, the embodiments of the present invention have been described. However, the present invention is not limited to the above embodiment, but various modifications of the present invention are possible within the scope of the technical idea described in the claims, specification, and drawings. For example, the locking piece 40 and the concave portion 16 provided in the locking mechanism 50 shown in the above-described embodiments are merely examples in shape and layouts. These may have other shapes and layouts.

The invention claimed is:

1. A solenoid valve, a control body, and an attachment structure for attaching the solenoid valve to the control body comprising:
   the solenoid valve comprising a body section housing an electromagnetic coil, a shaft-shaped valve section having a valve function, the valve section driven by the electromagnetic coil and continued coaxially to the body section, and a locking piece with elasticity connected to a ground terminal of the electromagnetic coil and projecting out from an outer periphery of the body section;
   the control body comprising an insertion hole for inserting the valve section to the control body, and an engaged portion provided on an upper surface of the control body;
   the attachment structure comprising a locking mechanism which is the locking piece connected into the engaged portion and; and
   wherein by inserting the valve section into the insertion hole, the locking piece elastically engages with the engaged portion to lock the solenoid valve, and the solenoid valve is grounded through a contact between the locking piece and the engaged portion.

2. The solenoid valve, the control body, and the attachment structure according to claim 1 wherein the locking piece is a portion of a yoke surrounding the electromagnetic coil or an elastic metal piece joined integrally with the yoke.

3. The solenoid valve, the control body, and the attachment structure according to claim 1,
   wherein the engaged portion is formed into a concave portion by hollowing the upper surface of the control body, the engaged portion comprising a groove portion extending from the engaged portion toward the opposite side to an insertion portion on the upper surface of the control body,
   wherein the groove portion has a narrower width than the locking piece and the concave portion, and
   wherein the locking piece retreats from a position at which the locking piece engages with the concave portion by bending the locking piece using a tool inserted in the concave portion via the groove portion.

4. The solenoid valve, the control body, and the attachment structure according to claim 1,
   wherein the engaged portion is a through hole penetrating from the upper surface of the wherein control body to a lower surface thereof, and
   wherein the locking piece retreats from a position at which the locking piece engages with the engaged portion by bending the locking piece using a tool inserted in the engaged portion from the lower surface of the control body via the engaged portion.

5. The solenoid valve, the control body, and the attachment structure according to claim 2,
   wherein the engaged portion is formed into a concave portion by hollowing the upper surface of the control body, the engaged portion comprising a groove portion extending from the engaged portion toward the opposite side to an insertion portion on the upper surface of the control body,
   wherein the groove portion has a narrower width than the locking piece and the concave portion, and
   wherein the locking piece retreats from a position at which the locking piece engages with the concave portion by bending the locking piece using a tool inserted in the concave portion via the groove portion.

6. The solenoid valve, the control body, and the attachment structure according to claim 2,
   wherein the engaged portion is a through hole penetrating from the upper surface of the control body to a lower surface thereof, and
   wherein the locking piece retreats from a position at which the locking piece engages with the engaged portion by bending the locking piece using a tool inserted in the engaged portion from the lower surface of the control body via the engaged portion.

* * * * *